O. J. BYHRE.
NUT LOCK.
APPLICATION FILED MAY 26, 1916.
1,221,413.
Patented Apr. 3, 1917.
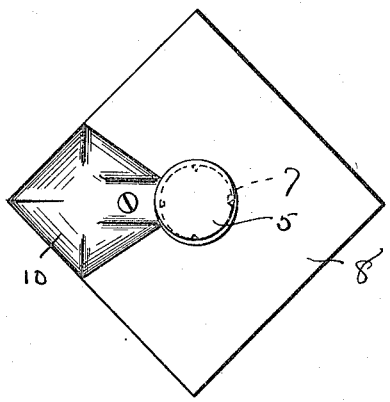
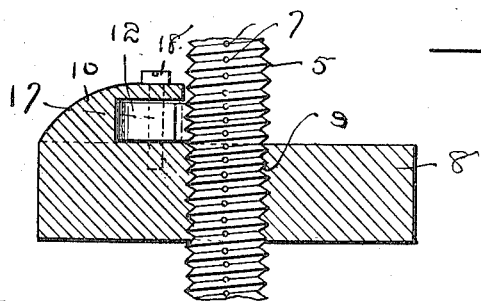
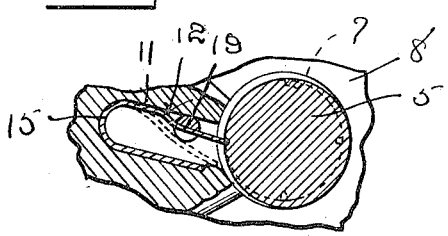
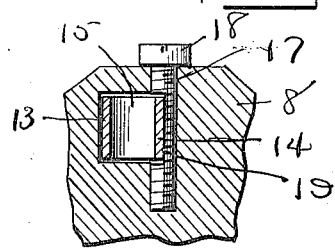
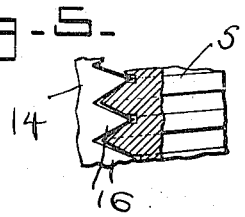
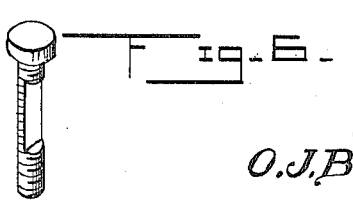
Inventor
O. J. Byhre,

UNITED STATES PATENT OFFICE.

OSCAR J. BYHRE, OF CANTON, WISCONSIN.

NUT-LOCK.

1,221,413. Specification of Letters Patent. Patented Apr. 3, 1917.

Application filed May 26, 1916. Serial No. 100,103.

*To all whom it may concern:*

Be it known that I, OSCAR J. BYHRE, a citizen of the United States, residing at Canton, in the county of Barron and State of Wisconsin, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks, and has for its primary object to provide an exceptionally simple and effective spring locking element which is built into an integral boss or enlargement formed on the outer face of the nut and engaging the bolt in such manner as to prevent the nut from being removed therefrom.

Another object is the provision of means for releasing or withdrawing the bolt engaging end of the spring locking element from engagement with the bolt to permit removal of the nut.

With these and other objects in view, the invention consists in the novel construction, combination and arrangement of parts as will be hereinafter specifically described, claimed and illustrated in the accompanying drawing, in which:

Figure 1 is an end elevation of the improved nut lock.

Fig. 2 represents a diametrical sectional view through the nut, showing the bolt in side elevation and partly broken away, Fig. 3 represents an enlarged sectional view, partly broken away, through the bolt and nut in the plane of the integral boss or enlargement carried by the nut, Fig. 4 represents a detail sectional view through the nut, taken at right angles to Fig. 3, Fig. 5 represents an enlarged fragmentary plan view of the bolt engaging end of the spring locking element, showing a fragment of the bolt, and Fig. 6 represents a perspective view of the releasing screw removed.

Referring to the drawing in detail, wherein similar reference numerals designate corresponding parts throughout the several views, the numeral 5 indicates the preferred type of bolt having external screw threads 6 extending inwardly from one end. A plurality of rows of indentations or recesses 7 are formed in the groove defined by the screw threads and are adapted to coöperate with the spring locking element, to be hereinafter described, to prevent the nut from loosening upon the bolt.

The nut 8 is formed with an internally screw threaded bore 9 fitting the external screw threads of the bolt 5, and is provided, upon its outer face, with an integral boss or enlargement 10, having a substantially U-shaped cavity 11, the mouth or open end of which is directed toward and communicates with the bore 9.

A substantially U-shaped spring locking element, designated generally by the numeral 12, is movably fitted in the recess 11 and is preferably constructed of flat resilient metal. The locking element includes relatively short and long legs 13 and 14, which are connected by the curved web portion 15. The relatively short leg 13 fits against one side wall of the recess 11, while the free terminal of the long leg 14 is formed with a plurality of pointed teeth 16, which are so shaped as to snugly fit the external screw threads of the bolt 5.

A pin or screw 17 is fitted in the walls of the recess 11 and is arranged between the relatively long bolt-engaging leg 14 and the adjacent side wall of the recess. The medial portion of the screw 17 is cut away, as indicated at 19, to accommodate the long leg of the spring locking element and the outer exposed terminal thereof is provided with a head 18, whereby the screw may be conveniently turned.

In use, the screw 17 is adjusted so as to permit the long leg 14 of the spring locking element to rest within the recess 19 and the nut 8 is applied to the bolt 5 and advanced to the desired position thereon in the usual manner. Subsequent to the adjustment of the nut 8, it is effectively locked against rotation in the opposite direction by the teeth 16 of the spring locking element engaging in the recesses or indentations 7 in the bolt 5. When it is desired to remove the nut from the bolt, the screw 17 is given a quarter of a turn by a suitable tool applied to the head 18, thereby moving the toothed terminal 16 of the long leg of the spring locking element out of engagement with the threads of the bolt 5 and permitting free rotation of the nut thereon.

What I claim is:

1. A nut lock comprising a bolt, a nut fitted upon said bolt, a boss or enlargement formed upon the outer face of said nut having a recess therein, a substantially U-shaped spring locking element engaged in said recess and having one end engaged with said bolt to lock the nut against rotation thereon, and a recessed screw fitted in said nut between one wall of the recess in the boss or enlargement and the bolt-engaging end of said spring locking element for withdrawing the latter from engagement with said bolt.

2. A nut lock comprising a bolt, a nut fitted upon said bolt, an integral enlargement or boss formed on said nut having a recess therein, a substantially U-shaped spring locking element engaged in said recess and including relatively long and short legs, teeth formed upon the inner terminal of the relatively long leg engaged with the screw threads of said bolt to lock the nut against rotational movement thereon, and a recessed screw fitted in said enlargement or boss between the relatively long legs and the adjacent wall of said recess for withdrawing said long leg from engagement with said bolt.

In testimony whereof I affix my signature in presence of two witnesses.

OSCAR J. BYHRE.

Witnesses:
R. A. MILLER,
FLORENCE THOMPSON.

Copies of this patent may be obtained for five cents each, by addressing the "Commissioner of Patents, Washington, D. C."